US009568076B2

(12) United States Patent
McGrath

(10) Patent No.: US 9,568,076 B2
(45) Date of Patent: Feb. 14, 2017

(54) CYCLOID DRIVE EPICYCLOID PLANET GEAR CAM

(71) Applicant: MECHATRONICSASIA ENTERPRISE, Taipei (TW)

(72) Inventor: Patrick James McGrath, Taipei (TW)

(73) Assignee: Patrick James McGrath, Hokkaido (JP)

( * ) Notice: Subject to any disclaimer, the term of this patent is extended or adjusted under 35 U.S.C. 154(b) by 98 days.

(21) Appl. No.: 14/700,483

(22) Filed: Apr. 30, 2015

(65) Prior Publication Data

US 2015/0233453 A1 Aug. 20, 2015

Related U.S. Application Data

(63) Continuation-in-part of application No. 13/691,911, filed on Dec. 3, 2012, now Pat. No. 9,052,001.

(51) Int. Cl.
*F16H 1/32* (2006.01)
*F16H 25/12* (2006.01)
*F16H 25/14* (2006.01)

(52) U.S. Cl.
CPC ............ *F16H 25/125* (2013.01); *F16H 25/14* (2013.01); *F16H 2001/323* (2013.01); *Y10T 74/18056* (2015.01)

(58) Field of Classification Search
CPC .... F16H 25/08; F16H 2001/323; F16H 25/12; F16H 25/125; F16H 25/14; F16H 21/30; F16H 21/28; F16H 1/28; F16H 1/32; F16H 53/06; Y10T 74/2107; Y10T 74/18056

See application file for complete search history.

(56) References Cited

U.S. PATENT DOCUMENTS

| | | | | |
|---|---|---|---|---|
| 4,338,831 A | * | 7/1982 | Rodaway | F16H 3/70 475/169 |
| 4,552,037 A | * | 11/1985 | Distin, Jr. | F16H 1/32 475/159 |
| 5,498,215 A | * | 3/1996 | Hosokawa | F16H 1/32 475/162 |
| 9,052,001 B2 | * | 6/2015 | McGrath | F16H 1/32 |
| 2010/0216585 A1 | * | 8/2010 | Imase | F16H 1/32 475/168 |

* cited by examiner

*Primary Examiner* — Ramya Burgess
*Assistant Examiner* — Lillian Nguyen
(74) *Attorney, Agent, or Firm* — Rosenberg, Klein & Lee

(57) ABSTRACT

An epicycloid planet gear cam that converts rotational movement of a driveshaft into linear movement of an output device is disclosed. An epicycloid planet gear is assembled inside a stationary housing with an internal stationary ring gear. A driveshaft eccentric is connected to a driveshaft. The driveshaft eccentric rotates freely in a mounting hole of the epicycloid planet gear. When the driveshaft rotates, the driveshaft eccentric engages the epicycloid planet gear against the stationary ring gear and causes the epicycloid planet gear to rotate. A cam follower pin attached to an output device is held, via a follower roller ball against a cam track of the epicycloid planet gear. As the epicycloid planet gear rotates, the recessed cam track depth causes the cam follower pin to move up or down thereby moving the output device.

13 Claims, 7 Drawing Sheets

B-B

CYCLOID DRIVE EPICYCLOID PLANET GEAR CAM

REFERENCE TO RELATED APPLICATION

This application is being filed as a Continuation-in-Part application of Ser. No. 13/691,911, filed 3 Dec. 2012, currently pending.

BACKGROUND OF THE INVENTION

Field of the Invention

The present invention relates to cycloid drives. More specifically, the present invention discloses an epicycloid planet gear mounted recessed cam track for converting rotational movement of a driveshaft into linear movement of an output object while utilizing the advantageous speed reduction and torque magnification properties of a cycloid drive combined with the incline mechanical advantage of an inclined cam track.

Description of the Prior Art

A leadscrew is a screw used to translate rotary input motion into useful linear output motion. The conventional leadscrew is a threaded screw that mates with a nut. As the threaded screw rotates, the nut moves along the screw either forward or backward. A load connected to the nut moves along with the nut.

Disadvantages of a leadscrew are that thread pitches below 0.2 mm are difficult and costly to manufacture, leading to a practical limit of 0.2 mm step sizes per revolution of a rotary input device, load carrying capacities and efficiencies of such micro threads are very limited, and it is difficult to achieve anything other than a constant output motion of a driven device by varying the pitch of a leadscrew.

Another method for translating rotary motion into useful linear motion is by using a speed reduction gear train whose output gear causes a circular cam to rotate, thereby creating linear output motion of some driven component.

Disadvantages of a gear train driven cam are its complexity if large speed reductions are required, the inherent inaccuracy and higher cost of so many moving parts and the space requirements necessary to fit so many mechanical parts.

Therefore, there is need for an improved means of efficiently, compactly, accurately and economically translating high speed, low force rotational motion into low speed, increased force linear motion.

SUMMARY OF THE INVENTION

To achieve these and other advantages and in order to overcome the disadvantages of the conventional methods in accordance with the purpose of the invention as embodied and broadly described herein, the present invention provides an epicycloid planet gear mounted recessed cam track that converts rotational movement of a driveshaft into infinitely variable precision linear movement of an output device.

The epicycloid planet gear cam, also called the cycloid drive cam, of the present invention simultaneously converts high speed, low force rotary motion to low speed, infinitely variable linear output motion, at a significantly increased driving force due to a combination of incline mechanical advantage and cycloid drive torque multiplication, and, unlike a conventional rotary cam or rotary face cam, does on with fewer, easily manufactured moving parts at higher accuracy and lower cost in a more compact space. Unlike a leadscrew, the epicycloid planet gear cam is capable of steps per input revolution as small as microns, at low cost and high output force, using easily manufactured parts and is capable of infinitely variable linear motion profiles.

The epicycloid planet gear cam, also called the cycloid drive cam, of the present invention comprises a stationary housing with an internal stationary ring gear. An epicycloid planet gear, also called a cycloid disc, is assembled inside the stationary housing and a housing cap. A driveshaft eccentric is connected to a driveshaft such as, for example a driveshaft of a direct current (DC) motor or a manually rotated driveshaft. The driveshaft eccentric freely rotates in a mounting hole of the epicycloid planet gear. When the driveshaft rotates, the driveshaft eccentric engages the epicycloid planet gear with the stationary ring gear in standard cycloid drive fashion and causes the epicycloid planet gear to independently rotate around the driveshaft eccentric in a direction of rotation opposite that of the driveshaft at a standard cycloid speed reduction rate, r, of $r=(P-L)/L$ where P equals the number of ring gear lobes on the stationary housing and L is the number of cycloid lobes on the eccentrically rotating epicycloid planet gear. For example, if there are 11 ring gear lobes on the stationary ring gear and 10 cycloid lobes on the epicycloid planet gear the speed reduction ratio that the epicycloid planet gear would rotate at relative to the stationary housing is $r=(11-10)/10=1/10$. At the same time, the output torque of the rotating epicycloid planet gear would be ten times greater than the input torque minus a small factor for mechanical losses.

If the driveshaft eccentric incorporates a counterbalance feature as in the present embodiment which is 180° out of phase with the driveshaft eccentric and equal in moment, any significant high speed vibrations caused by any unbalanced rotating forces of the eccentric rotating at high speeds are eliminated.

The epicycloid planet gear further comprises a recessed cam track of varying height below the top surface of the body of the epicycloid planet gear. A cam follower pin is held against the cam track. As the epicycloid planet gear rotates, the depth of the recessed cam track causes the cam follower pin to move up or move down. Since the cam follower pin is connected to an output device the output device moves along with the cam follower pin.

As a result, the epicycloid planet gear cam of the present invention simply and effectively converts rotational movement of the driveshaft into linear movement of the output device.

The shape or pattern of the cam track is determined by the path generated by a fixed imaginary point atop the epicycloid planet gear as the epicycloid planet gear rotates.

As the epicycloid planet gear travels around the ring gear in a cycloid fashion (rather than a strictly circular fashion), the follower pin, fixed at one point on the generated cycloid path, is stationary in a horizontal axis and only moves up and down in a vertical motion. To maintain a constant contact with the cam track, the pattern of the cam track is similar to an oscillating wave pattern. While the ring gear is stationary and the upper stem and lower stem of the driveshaft eccentric are in a stationary vertical position, and the follower roller ball and the follower pin are in a fixed horizontal position, the epicycloid gear rotates around the stationary ring gear. The pattern of the cam track is formed so that the follower roller ball maintains contact with the cam track during forward and reverse movement of the epicycloid planet gear.

Additionally, the epicycloid planet gear cam of the present invention is more efficient and adaptable than conventional leadscrews. The efficiency benefit provided by the cooperation of the epicycloid planet gear, the internal stationary ring gear, and the driveshaft eccentric is superior to conventional leadscrews. Also, the flexibility in design of the cam track of the present invention allows for advanced control of movement of the output device that can not be matched by conventional leadscrews without costly electronic control systems. In addition, very fine, accurate and repeatable output movements per input rotation can be easily achieved with a varying depth epicycloid planet gear cam track that are prohibitive to do with a leadscrew or gear train device. For example, a linear output motion of 0.01 mm per input rotation of some device such as a motor can easily be achieved by creating a 10-to-1 speed reduction epicycloid planet gear with a recessed cam track of total 0.1 mm rise (or fall) from start to end. Economically manufacturing a micro leadscrew with a pitch of 0.01 mm is beyond the capability of current manufacturing technology though. Furthermore, such a leadscrew would be very limited in its load bearing capacity, while an epicycloid planet gear cam can transmit very high linear output forces.

Furthermore, the simplicity of the epicycloid planet gear cam allows for ease of manufacture, including all molded plastic construction, and fast, low skilled assembly methods, thereby reducing production costs.

Moreover, the greater distribution of loaded contact surfaces of the epicycloid planet gear cam results in low wear on components of the epicycloid planet gear cam thereby extending the operational lifetime of the epicycloid planet gear cam driven device relative to other devices.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
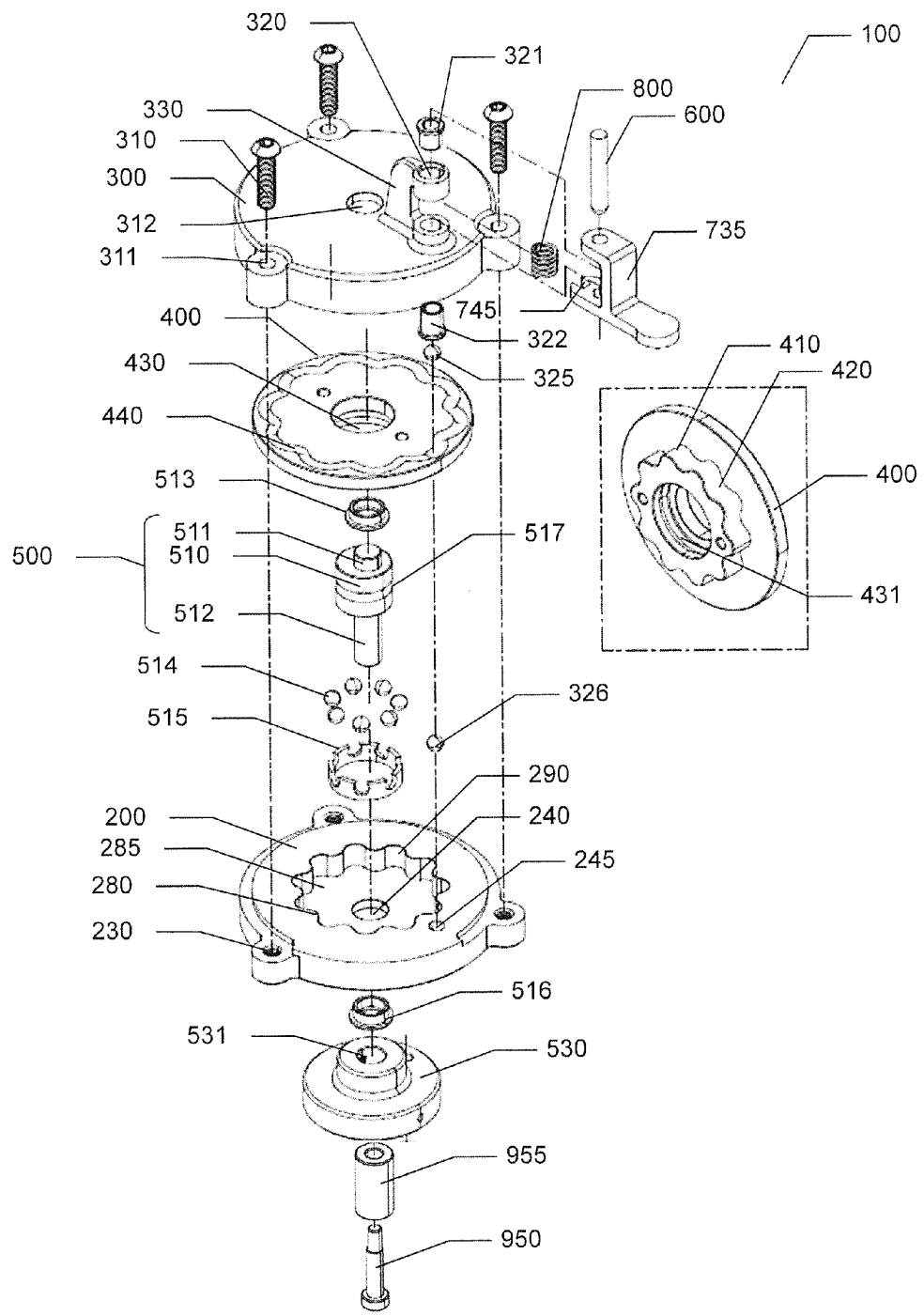
FIG. 1 is an exploded view drawing illustrating an epicycloid planet gear cam according to an embodiment of the present invention.
Figure 2A:
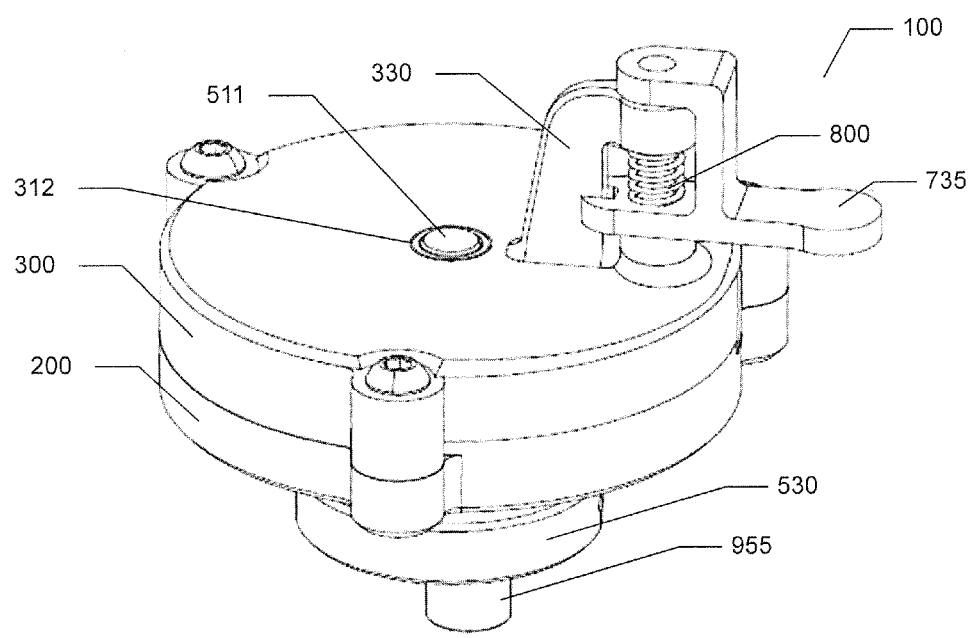
FIG. 2A is an isometric view drawing illustrating an epicycloid planet gear cam according to an embodiment of the present invention.
Figure 2B:
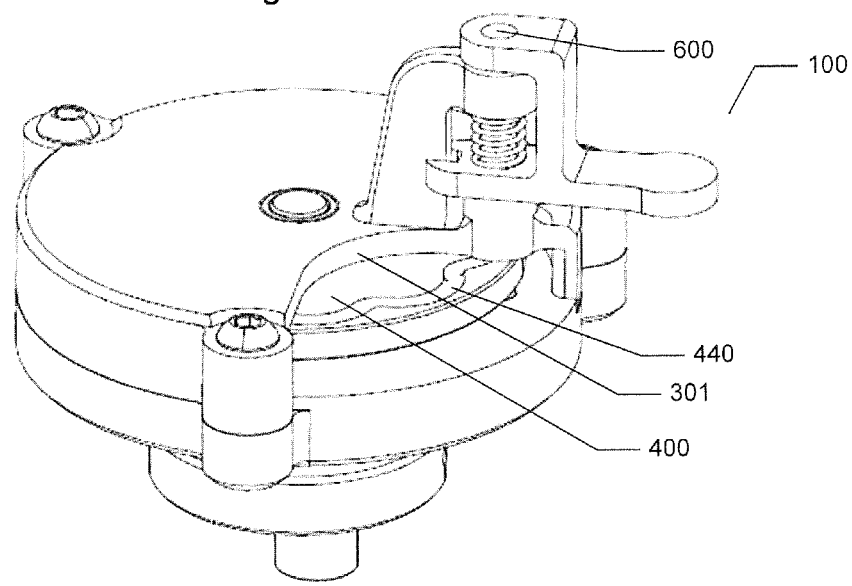
FIG. 2B is an isometric view drawing with cutaway illustrating an epicycloid planet gear cam according to an embodiment of the present invention.
Figure 3A:
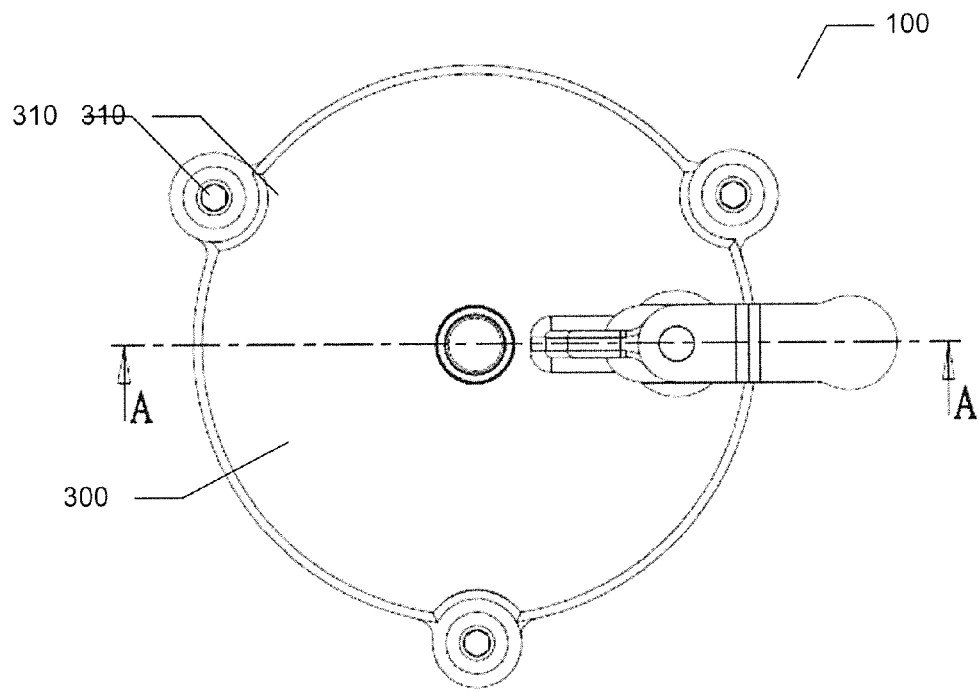
FIG. 3A is a top view drawing illustrating an epicycloid planet gear cam according to an embodiment of the present invention.
Figure 3B:
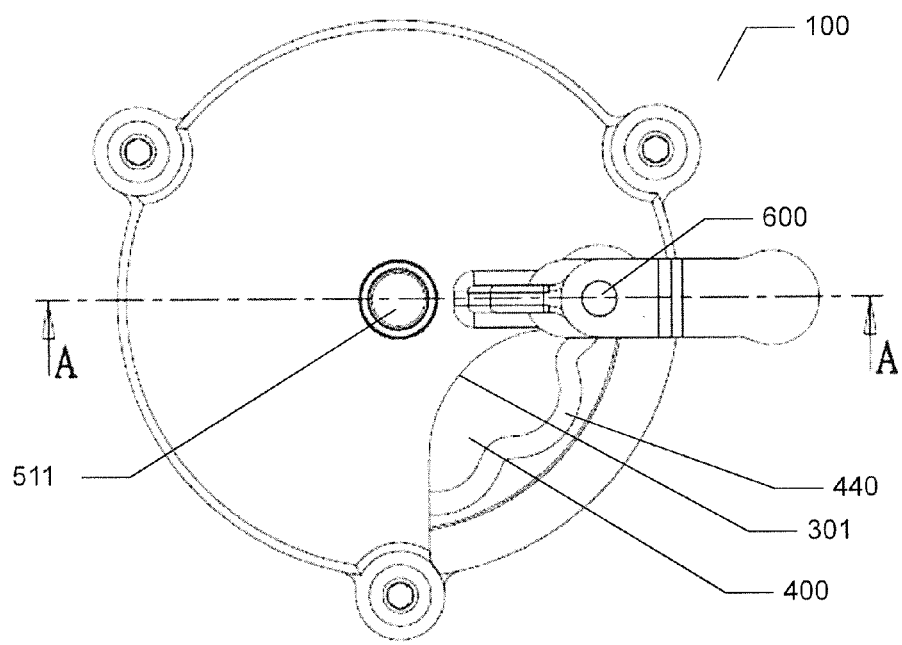
FIG. 3B is a top view drawing with cutaway illustrating an epicycloid planet gear cam according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Refer to FIGS. 1, 2A-2B, and 3A-3B. Note that FIGS. 2B and 3B include a cutaway 301 in the housing cap for clarity in illustrating the epicycloid planet gear 400, cam track 440 and follower pin 600 positioning. The epicycloid planet gear cam, also called the cycloid drive cam, 100 of the present invention comprises a stationary housing 200, a housing cap 300, an epicycloid planet gear, also called a cycloid disc, 400, a driveshaft eccentric 500, and a cam follower pin 600.

The stationary housing 200 comprises an internal stationary ring gear 285. The epicycloid planet gear 400 and the driveshaft eccentric 500 are assembled inside the stationary housing 200 and the housing cap 300 is assembled to the stationary housing 200 thereby encasing the epicycloid planet gear 400 and the driveshaft eccentric 500 inside the housing cap 300 and the stationary housing 200.

The driveshaft eccentric 500 is fixed to a driveshaft 955 of a DC motor or hand crank with a driveshaft connector 950 and freely rotates in the eccentric mounting hole 430 of the epicycloid planet gear 400. When the driveshaft 955 turns the driveshaft eccentric 500 will rotate and cause the epicycloid planet gear 400 to rotate around the stationary ring gear 285 in an opposite direction to the driveshaft 955 rotational direction.

As the epicycloid planet gear 400 rotates, a cam track 440 of the epicycloid planet gear 400 causes the cam follower pin 600 to rise and fall as a spring 800 exerts pressure on an output device 735 to hold the cam follower pin 600 to the cam track 440.

Since the cam follower pin 600 is press fitted to the output device 735, the output device 735 moves along with the cam follower pin 600.

The stationary housing 200 comprises a plurality of threaded holes 230, a driveshaft clearance hole 240, and a stationary ring gear 285 comprising a plurality of ring gear lobes 280, and a plurality of ring gear lobe clearances 290.

In this embodiment of the present invention the housing cap 300 is attached to the stationary housing 200 by inserting threaded fasteners 310 through fastener holes 311 of the housing cap 300 into the threaded holes 230 of the stationary housing 200. In other embodiments of the present invention the housing cap 300 and the stationary housing 200 are assembled using various other methods to attach the housing cap 300 and the stationary housing 200 together.

The driveshaft clearance hole 240 is disposed in the body of the stationary housing 200 to allow the driveshaft 955 to connect with the driveshaft eccentric 500. The plurality of ring gear lobes 280 and the plurality of ring gear lobe clearances 290 between the ring gear lobes 280 are disposed in the interior of the stationary housing 200 to form the stationary ring gear 285. The ring gear lobes 280 and ring gear lobe clearances 290 engage with cycloid lobes 410 and cycloid lobe clearances 420 of the epicycloid planet gear 400 and allow the epicycloid planet gear 400 to rotate around the interior of the stationary housing 200.

The housing cap 300 further comprises a cam follower clearance hole 320 and a cam follower support bracket 330.

Disposed on the top of the housing cap 300 is the cam follower support bracket 330. The cam follower clearance hole 320 in the cam follower support bracket 330 allows the cam follower pin 600 to travel up and down through the cam follower clearance hole 320. An upper sleeve 321 and a lower sleeve 322 are positioned in the cam follower clearance hole 320 to reduce friction during movement of the follower pin 600.

As the cam follower pin 600 travels up and down an anti-rotation feature 745 on the output device 735 slides along the cam follower support bracket 330 of the housing cap 300. As the output device 735 moves the arms of the anti-rotation feature 745 closely but freely hug the cam follower support bracket 330 and the output device 735 is prevented from rotating.

Refer to FIGS. 5 and 6A-6C while continuing to refer to FIGS. 1-3B.

The epicycloid planet gear 400 comprises a plurality of cycloid lobes 410, a plurality of cycloid lobe clearances 420, an eccentric mounting hole 430, and a cam track 440.

The plurality of cycloid lobes 410 is disposed around the bottom of the epicycloid planet gear 400. Between each cycloid lobe 410 is a cycloid lobe clearance 420. The cycloid lobes 410 and the cycloid lobe clearances 420 engage with the ring gear lobes 280 and ring gear lobe clearances 290 of the stationary ring gear 285 of the stationary housing 200 and allow the epicycloid planet gear 400 to rotate around the interior of the stationary housing 200.

The eccentric mounting hole 430 is provided to allow the epicycloid planet gear eccentric driver 510 of the driveshaft eccentric 500 to cause rotational movement of the epicycloid planet gear 400 in cycloid drive fashion. It should be noted that the epicycloid planet gear 400 is not attached to the driveshaft eccentric 500 and the epicycloid planet gear eccentric driver 510 is only positioned into the eccentric mounting hole 430 of the epicycloid planet gear 400.

The cam track 440 is disposed in the top surface of the epicycloid planet gear 400. The cam track 440 comprises a recess pattern around the epicycloid planet gear 400 that gradually increases in depth beneath the top surface of the epicycloid planet gear 400.

Figure 6A:
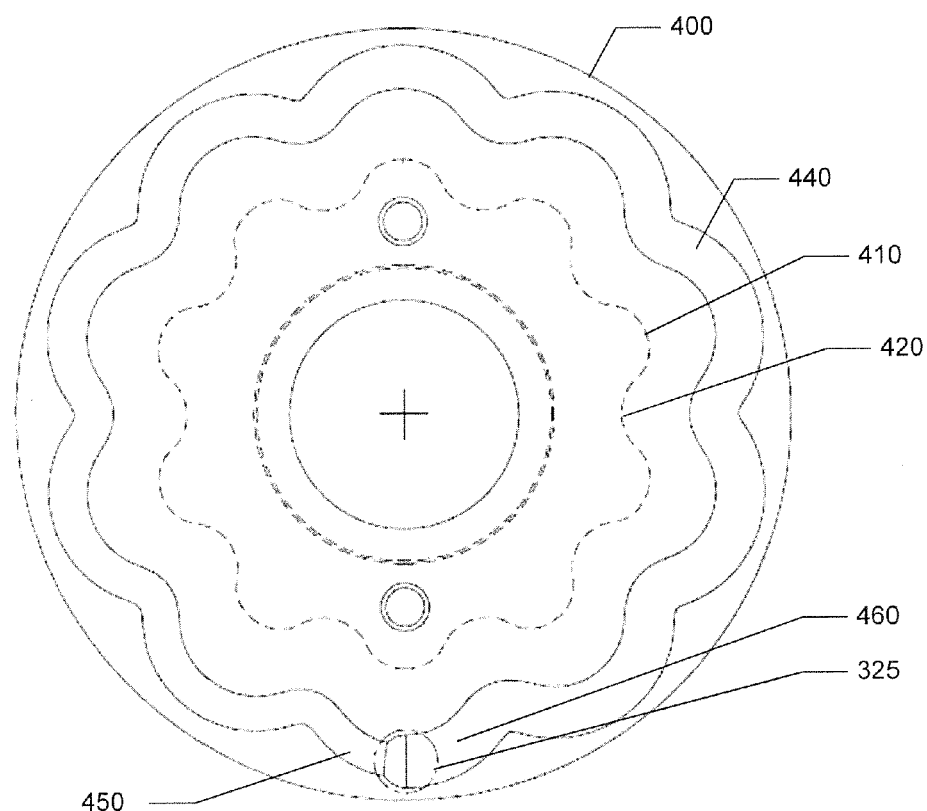
FIG. 6A is a drawing illustrating a cam track of an epicycloid planet gear according to an embodiment of the present invention.
Figure 6B:
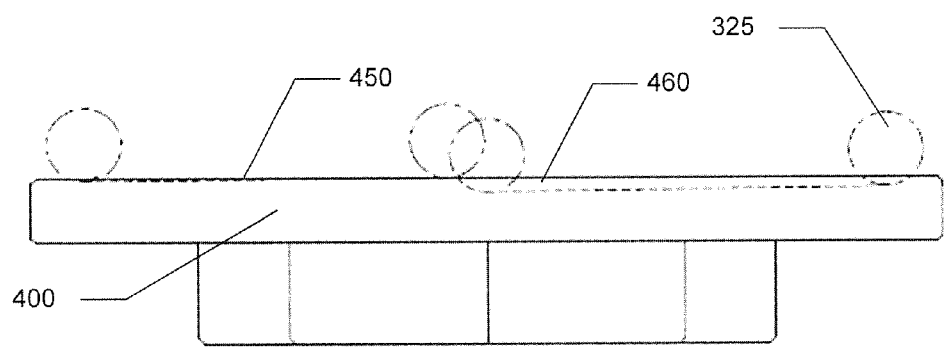
FIG. 6B is a drawing illustrating a cam track and a roller ball according to an embodiment of the present invention.

In the embodiment of FIG. 6B at the cam track start 450 the depth of the cam track 440 is at its shallowest depth and at the cam track end 460 the depth of the cam track 400 is at its deepest depth.

Figure 6C:
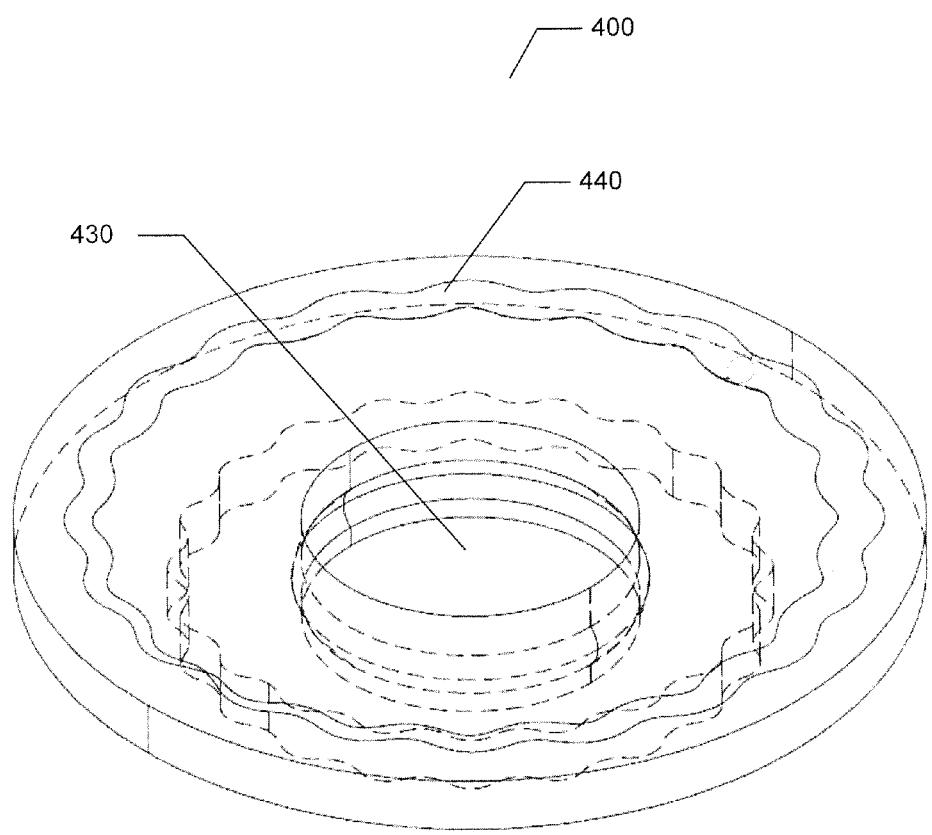
FIG. 6C is a drawing illustrating an endless cam track of an epicycloid planet gear according to an embodiment of the present invention.

In the embodiment of FIG. 6C the cam track comprises an endless cam track 440 where the cam track 440 gradually increases in depth below the top surface of the epicycloid planet gear 400 before gradually returning to its original start depth at the cam track end which coincides with the cam track start in endless loop fashion.

The shape or pattern of the cam track 440 is determined by the path generated by a fixed imaginary point atop the epicycloid planet gear 400 as the epicycloid planet gear 400 rotates.

Figure 4:
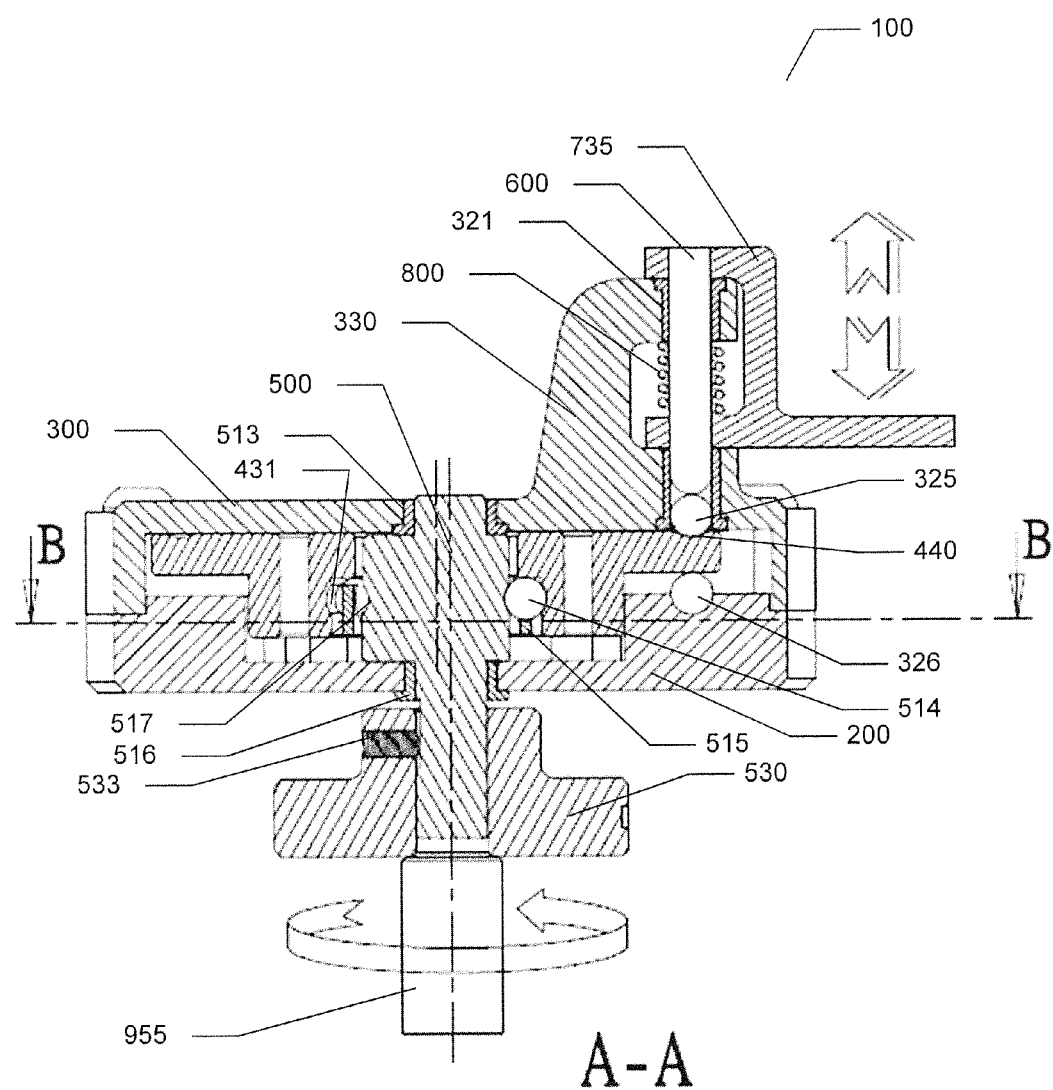
FIG. 4 is cross-sectional drawing illustrating internal assembled components of an epicycloid planet gear cam according to an embodiment of the present invention.
Figure 5:
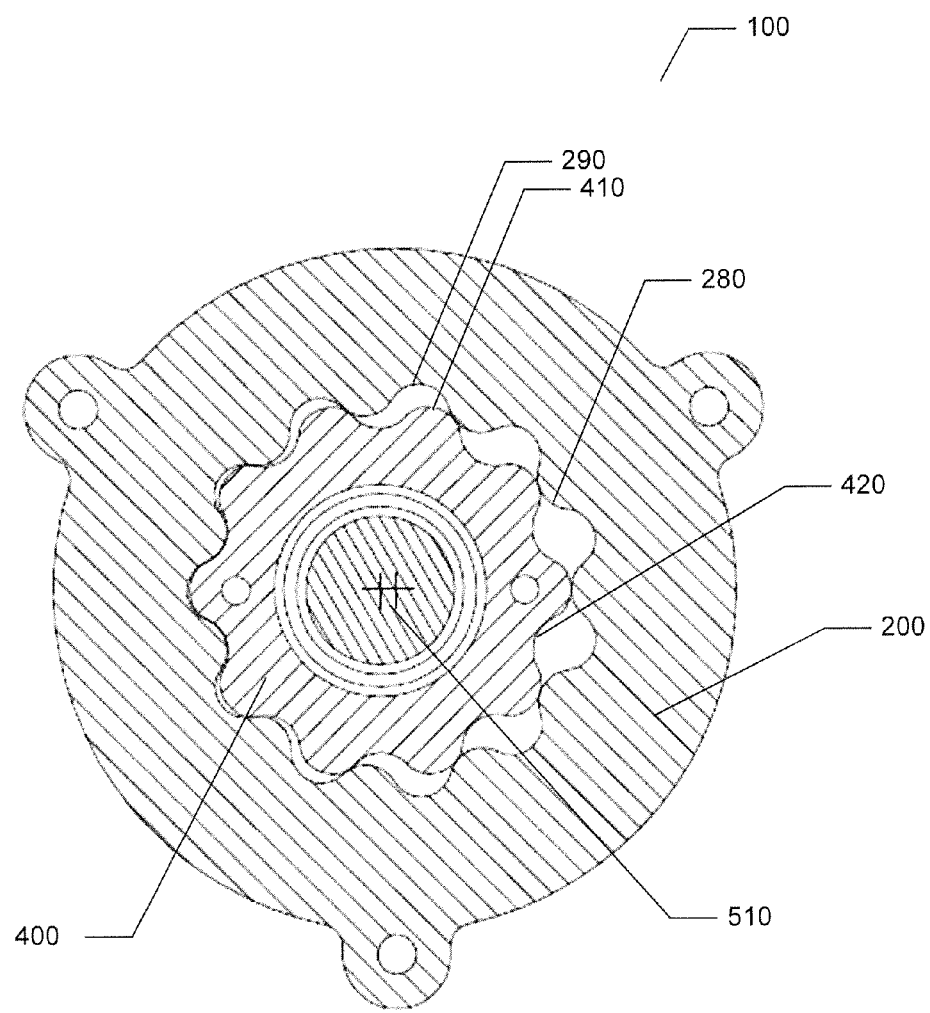
FIG. 5 is a drawing illustrating an epicycloid planet gear and stationary ring gear according to an embodiment of the present invention.

Refer to FIG. 4 while referring to FIGS. 1-3B and 5-6B.

When assembled, a follower roller ball 325 positioned under the cam follower pin 600 contacts the cam track 440 and the spring 800 provides pressure downwards on the output device 735 to push the follower roller ball 325 under the cam follower pin 600 down on the cam track 440. As the epicycloid planet gear 400 rotates, the cam track 440 causes the cam follower pin 600, via the follower roller ball 325, to move in relation to the depth of the cam track 440. For example, as the cam track 440 increases in depth the cam follower pin 600, via the follower roller ball 325, lowers and as the cam track 440 decreases in depth the cam follower pin 600 rises.

A support roller ball 326 is positioned in a support hole 245 in the top surface of the stationary housing 200. The support roller ball 326 is below the vertical position of the follower roller ball 325 and the epicycloid planet gear 400 separates the support roller ball 325 and the follower roller ball 325. As the follower roller ball 325 presses downward on the cam track 440, the support roller ball 326 supports the epicycloid planet gear 400 to prevent shifting or tilting of the epicycloid planet gear 400.

Additionally, controlling the rotational direction of the driveshaft 955 can affect the movement of the cam follower pin 600. For example, if the driveshaft 955 continues to rotate in one direction the cam follower pin 600 will repeatedly move in relation to the cam track 440 depth pattern over and over again in a cycle. However, if the rotational direction of the driveshaft 955 turns in one direction and then in the opposite direction different movement patterns of the cam follower pin 600 can be achieved. For example, the driveshaft 955 can be made to rotate in one direction until the cam follower pin 600 nears the cam track end 460 and then the driveshaft 955 can be made to rotate in the opposite direction until the cam follower pin 600 nears the cam track start 450. In this way, the rotational direction of the driveshaft 955 can control the position of the cam track 440 thereby controlling the movement of the cam follower pin 600 and the positioning of the output device 735. Furthermore, incremental changes in rotational direction of the driveshaft 955 provides for accurate positioning of the cam follower pin 600.

The driveshaft eccentric 500 comprises an epicycloid planet gear eccentric driver 510, an upper stem 511, a lower stem 512, and a roller groove 517.

During assembly the epicycloid planet gear eccentric driver 510 is positioned in the eccentric mounting hole 430 of the epicycloid planet gear 400. It should be noted that the driveshaft eccentric 500 is not attached to the epicycloid planet gear 400 and the epicycloid planet gear eccentric driver 510 freely rotates inside the eccentric mounting hole 430 of the epicycloid planet gear 400.

The roller groove 517 is disposed around the epicycloid planet gear eccentric driver 510. A roller ball set 514 comprising a plurality of roller balls rests in a ball seat 515. The roller balls of the roller ball set 514 are positioned between the driveshaft eccentric 500 and the eccentric mounting hole 430 and freely rotate in the roller groove 517 and a mounting hole groove 431 inside the eccentric mounting hole 430. The roller ball set 514 reduces friction and improves movement while providing stability for the driveshaft eccentric 500.

The upper stem 511 extends into a cap sleeve 513 disposed in a cap hole 312 of the housing cap 300. The lower stem 512 extends through a housing sleeve 516 disposed in the driveshaft clearance hole 240 in the stationary housing 200.

An eccentric driver counterbalance 530 is disposed under the bottom surface of the stationary housing 200 and is fixed to the lower stem 512. For example, the eccentric driver counterbalance 530 is fastened to the lower stem 512 by a set screw 533. The eccentric driver counterbalance 530 provides a counterbalance to the epicycloid planet gear eccentric driver 510 to reduce vibration. The eccentric driver counterbalance 530 is 180 degrees out of phase with the epicycloid planet gear eccentric driver 510 and equal in moment. A counterbalance hole 531 is provided to allow the lower stem 512 of the driveshaft eccentric 500 to connect to a driveshaft 955, for example the driveshaft of the DC motor or hand crank. In this embodiment a driveshaft fastener 950 is utilized to connect the driveshaft 955 to the lower stem 512. In other embodiments the driveshaft 955 comprises a fixed fastener on the driveshaft 955 to connect to the lower stem 512.

Following is a description of the operation of the epicycloid planet gear cam of the present invention. Refer to all Figures.

When the driveshaft 950 turns the connected driveshaft eccentric 500 also turns. The epicycloid planet gear eccentric driver 510 in the eccentric mounting hole 430 drives the epicycloid planet gear 400 in an eccentric, cycloidal motion. As the epicycloid planet gear eccentric driver 510 rotates in one direction the eccentric mounting hole 430 (and the epicycloid planet gear 400) rotates in the opposite direction.

As the epicycloid planet gear 400 rotates, the follower roller ball 325 rides the cam track 440 or encounters the cam track start 450. At the cam track start 450 the cam track 440 is at the shallowest depth, the follower roller ball 325 and the cam follower pin 600 is at its highest point, and the output device 735 is at its most extended position. As the epicycloid planet gear 400 continues to rotate the follower roller ball 325 rides along the cam track 440. As the cam track 440 increase in depth the follower roller ball 325 and the cam follower pin 600 lower and the output device 735 moves inward. As the cam track 440 decreases in depth the follower roller ball 325 and the cam follower pin 600 rise and the output device 735 moves outward.

By controlling the amount of rotation and the rotational direction of the driveshaft 950, the positioning of the output device 735 can be accurately controlled by positioning the follower roller ball 325 and cam follower pin 600 on the appropriate position on the cam track 440.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An epicycloid planet gear cam comprising:
    a stationary housing comprising:
        an internal stationary ring gear comprising a plurality of ring gear lobes and a plurality of ring gear lobe clearances disposed between the plurality of ring gear lobes; and
        a driveshaft clearance hole disposed inside of the internal stationary ring gear;
    a housing cap connecting to the stationary housing comprising:
        a cap hole in the housing cap;
        a cam follower support bracket disposed on top of the housing cap; and
        a cam follower clearance hole disposed in the cam follower support bracket;
    a cam follower pin disposed in the cam follower clearance hole, the cam follower pin connecting to an output device;
    a follower roller ball disposed beneath the cam follower pin;
    a spring disposed around the cam follower pin positioned between the cam follower support bracket and the output device;
    an epicycloid planet gear disposed in the internal stationary ring gear and between the stationary housing and the housing cap, the epicycloid planet gear comprising:
        a plurality of cycloid lobes and a plurality of cycloid lobe clearances disposed between the plurality of cycloid lobes;
            wherein, the plurality of cycloid lobes and the plurality of cycloid lobe clearance engage with the plurality of ring gear lobes and the plurality of ring gear lobe clearances;
        an eccentric mounting hole disposed in the epicycloid planet gear; and
        a cam track disposed in a top surface of the epicycloid planet gear, the follower roller ball contacting the cam track, the cam track comprising a recessed pattern around the epicycloid planet gear that gradually increases or decreases in depth beneath the top surface of the epicycloid planet gear;
            wherein the recessed pattern of the cam track is determined by a path generated by a fixed imaginary point atop the epicycloid planet gear as the epicycloid planet gear rotates;
    a driveshaft eccentric comprising:
        an epicycloid planet gear eccentric driver, the epicycloid planet gear eccentric driver rotating freely in the eccentric mounting hole;
        an upper stem extending into the cap hole; and
        a lower stem extending through the driveshaft clearance hole for connecting to a driveshaft;
            wherein, as the lower stem turns the epicycloid planet gear eccentric driver causes the epicycloid planet gear to rotate and the cam track causes the cam follower pin via the follower roller ball to move in relation to variances in depth of the cam track.

2. The epicycloid planet gear cam of claim 1, further comprising:
    a mounting hole groove disposed in the eccentric mounting hole;
    a roller groove disposed around the epicycloid planet gear eccentric driver; and
    a roller ball set positioned in a ball seat around the epicycloid planet gear eccentric driver between the roller groove and the mounting hole groove.

3. The epicycloid planet gear cam of claim 1, further comprising:
    a support hole in the stationary housing; and
    a support roller ball positioned in the support hole between the stationary housing and the epicycloid planet gear.

4. The epicycloid planet gear cam of claim 1, the cam track comprising:
    a cam track start; and
    a cam track end, the cam track gradually increasing in depth below the top surface of the epicycloid planet gear starting from the cam track start to the cam track end.

5. The epicycloid planet gear cam of claim 1, the cam track gradually increasing in depth before gradually returning to an original starting depth in endless loop fashion.

6. The epicycloid planet gear cam of claim 1, further comprising:
a cap sleeve disposed in the cap hole around the upper stem of the driveshaft eccentric.

7. The epicycloid planet gear cam of claim 1, further comprising:
a housing sleeve disposed in the driveshaft clearance hole around the lower stem of the driveshaft eccentric.

8. The epicycloid planet gear cam of claim 1, further comprising:
an upper sleeve and a lower sleeve disposed in cam follower clearance hole around the follower pin.

9. The epicycloid planet gear cam of claim 1, further comprising:
cap fastener holes in the housing cap;
stationary housing holes in the stationary housing; and
a plurality of fasteners for attaching the housing cap and the stationary housing together via the cap fastener holes and the stationary housing holes.

10. An epicycloid planet gear cam comprising:
a stationary housing comprising:
an internal stationary ring gear comprising a plurality of ring gear lobes and a plurality of ring gear lobe clearances disposed between the plurality of ring gear lobes;
a driveshaft clearance hole disposed inside of the internal stationary ring gear; and
a support hole;
a housing cap connecting to the stationary housing comprising:
a cap hole in the housing cap;
a cam follower support bracket disposed on top of the housing cap; and
a cam follower clearance hole disposed in the cam follower support bracket;
a cam follower pin disposed in the cam follower clearance hole, the cam follower pin connecting to an output device;
a follower roller ball disposed beneath the cam follower pin;
a spring disposed around the cam follower pin positioned between the cam follower support bracket and the output device;
an epicycloid planet gear disposed in the internal stationary ring gear and between the stationary housing and the housing cap, the epicycloid planet gear comprising:
a plurality of cycloid lobes and a plurality of cycloid lobe clearances disposed between the plurality of cycloid lobes;
wherein, the plurality of cycloid lobes and the plurality of cycloid lobe clearance engage with the plurality of ring gear lobes and the plurality of ring gear lobe clearances;
an eccentric mounting hole disposed in the epicycloid planet gear;
a mounting hole groove disposed in the eccentric mounting hole; and
a cam track disposed in a top surface of the epicycloid planet gear, the follower roller ball contacting the cam track, the cam track comprising a recessed pattern around the epicycloid planet gear that gradually increases or decreases in depth beneath the top surface of the epicycloid planet gear;
wherein the recessed pattern of the cam track is determined by a path generated by a fixed imaginary point atop the epicycloid planet gear as the epicycloid planet gear rotates;
a support roller ball positioned in the support hole between the stationary housing and the epicycloid planet gear;
a driveshaft eccentric comprising:
an epicycloid planet gear eccentric driver, the epicycloid planet gear eccentric driver rotating freely in the eccentric mounting hole;
an upper stem extending into the cap hole;
a lower stem extending through the driveshaft clearance hole for connecting to a driveshaft; and
a roller groove disposed around the epicycloid planet gear eccentric driver;
wherein, as the lower stem turns the epicycloid planet gear eccentric driver causes the epicycloid planet gear to rotate and the cam track causes the cam follower pin via the follower roller ball to move in relation to variances in depth of the cam track;
a roller ball set positioned in a ball seat around the epicycloid planet gear eccentric driver between the roller groove and the mounting hole groove; and
a counterbalance connected to the lower stem, the counterbalance 180 degrees out of phase with the epicycloid planet gear eccentric driver and equal in moment.

11. The epicycloid planet gear cam of claim 10, further comprising:
a cap sleeve disposed in the cap hole around the upper stem of the driveshaft eccentric; and
a housing sleeve disposed in the driveshaft clearance hole around the lower stem of the driveshaft eccentric.

12. The epicycloid planet gear cam of claim 10, further comprising:
an upper sleeve and a lower sleeve disposed in cam follower clearance hole around the follower pin.

13. The epicycloid planet gear cam of claim 10, further comprising:
cap fastener holes in the housing cap;
stationary housing holes in the stationary housing; and
a plurality of fasteners for attaching the housing cap and the stationary housing together via the cap fastener holes and the stationary housing holes.

* * * * *